US009939992B2

(12) United States Patent
Yoo et al.

(10) Patent No.: US 9,939,992 B2
(45) Date of Patent: *Apr. 10, 2018

(54) METHODS AND SYSTEMS FOR NAVIGATING A LIST WITH GESTURES

(71) Applicant: Microsoft Technology Licensing, LLC, Redmond, WA (US)

(72) Inventors: Frank Taehyun Yoo, Cupertino, CA (US); Steven Thomas Flory, Los Altos, CA (US); Sean Edward Beausoleil, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 287 days.

This patent is subject to a terminal disclaimer.

(21) Appl. No.: 14/639,847

(22) Filed: Mar. 5, 2015

(65) Prior Publication Data
US 2015/0177932 A1 Jun. 25, 2015

Related U.S. Application Data

(63) Continuation of application No. 13/026,035, filed on Feb. 11, 2011, now Pat. No. 9,015,639.

(51) Int. Cl.
G06F 3/0482 (2013.01)
G06F 3/0485 (2013.01)
G06F 3/0488 (2013.01)
G06F 3/01 (2006.01)

(52) U.S. Cl.
CPC ............ G06F 3/0482 (2013.01); G06F 3/016 (2013.01); G06F 3/0485 (2013.01); G06F 3/0488 (2013.01); G06F 3/04855 (2013.01); G06F 3/04883 (2013.01)

(58) Field of Classification Search
CPC .... G06F 3/0482; G06F 3/0485; G06F 3/0488; G06F 3/04883; G06F 3/04855; G06F 3/016
See application file for complete search history.

(56) References Cited

U.S. PATENT DOCUMENTS 6,509,912 B1 * 1/2003 Moran ................ G06F 3/04883 715/762
7,469,381 B2 12/2008 Ording
7,644,373 B2 * 1/2010 Jing .................. G06F 17/30265 715/838

(Continued)

OTHER PUBLICATIONS

"U.S. Appl. No. 13/026,035, Non Final Office Action dated Feb. 20, 2014", 25 pgs.

(Continued)

Primary Examiner — Abdullah Al Kawsar
Assistant Examiner — David A Spellman
(74) Attorney, Agent, or Firm — Schwegman Lundberg & Woessner, P.A.

(57) ABSTRACT

Methods and systems for facilitating the navigation of a list of content items with gestures are described. Consistent with some embodiments, a computing device detects simple gestures, and in response, display a preview of content items preceding, or following a currently selected content item, from the list of content items. Upon detecting a selection gesture, the computing device updates the view of the currently selected content item to display the newly selected content item.

20 Claims, 13 Drawing Sheets

(56) References Cited

U.S. PATENT DOCUMENTS

| | | |
|---|---|---|
| 9,015,639 B2 | 4/2015 | Yoo et al. |
| 2005/0210416 A1 | 9/2005 | MacLaurin et al. |
| 2008/0086703 A1* | 4/2008 | Flynt .................. G06F 3/0482 715/853 |
| 2008/0094369 A1 | 4/2008 | Ganatra et al. |
| 2008/0165161 A1 | 7/2008 | Platzer et al. |
| 2008/0165210 A1 | 7/2008 | Platzer et al. |
| 2008/0168384 A1 | 7/2008 | Platzer et al. |
| 2008/0168402 A1 | 7/2008 | Blumenberg |
| 2008/0168478 A1 | 7/2008 | Platzer |
| 2008/0180408 A1 | 7/2008 | Forstall et al. |
| 2009/0058822 A1 | 3/2009 | Chaudhri |
| 2009/0094562 A1 | 4/2009 | Jeong et al. |
| 2009/0125824 A1 | 5/2009 | Andrews et al. |
| 2010/0134425 A1* | 6/2010 | Storrusten ............ G06F 3/0425 345/173 |
| 2010/0194920 A1 | 8/2010 | Gai et al. |
| 2010/0214237 A1 | 8/2010 | Echeverri et al. |
| 2010/0283743 A1 | 11/2010 | Coddington |
| 2010/0325575 A1 | 12/2010 | Platzer et al. |
| 2010/0333014 A1 | 12/2010 | Fritzley et al. |
| 2011/0093812 A1 | 4/2011 | Fong |
| 2011/0252370 A1 | 10/2011 | Chaudhri |
| 2012/0011437 A1 | 1/2012 | James et al. |
| 2012/0011466 A1* | 1/2012 | Miyamoto ............ G06F 3/0485 715/786 |
| 2012/0044251 A1 | 2/2012 | Mark et al. |
| 2012/0062604 A1 | 3/2012 | Lobo et al. |
| 2012/0079430 A1 | 3/2012 | Kwahk et al. |
| 2012/0159393 A1 | 6/2012 | Sethi |
| 2012/0210214 A1 | 8/2012 | Yoo et al. |
| 2013/0152013 A1 | 6/2013 | Forstall et al. |
| 2013/0326398 A1 | 12/2013 | Zuverink et al. |

OTHER PUBLICATIONS

"U.S. Appl. No. 13/026,035, Notice of Allowance dated Dec. 23, 2014", 8 pgs.

"U.S. Appl. No. 13/026,035. Response filed Aug. 14, 2014 to Office Action dated Feb. 20, 2014.", 9 pgs.

\* cited by examiner

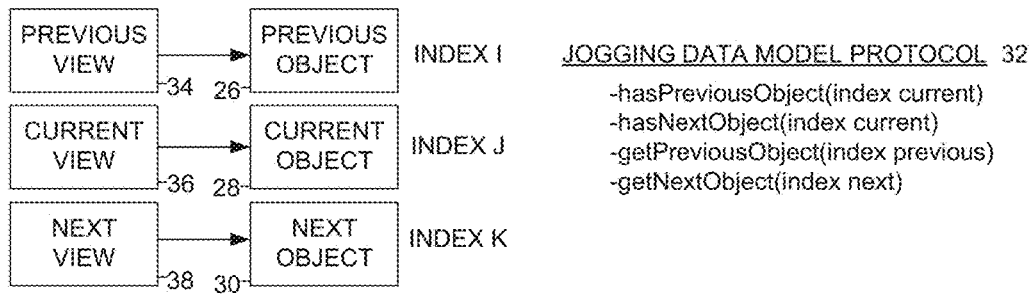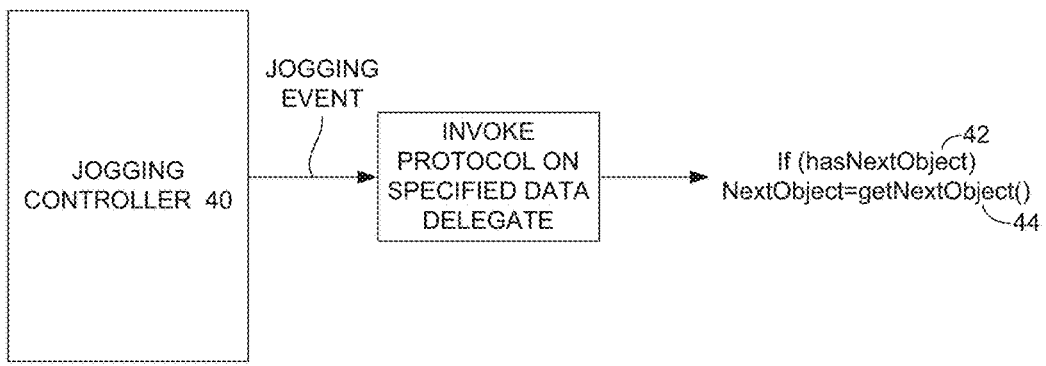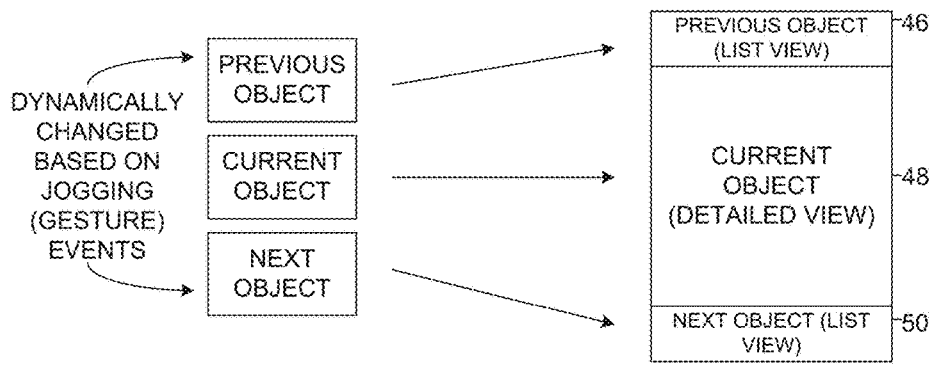
FIG. 2

METHODS AND SYSTEMS FOR NAVIGATING A LIST WITH GESTURES

RELATED APPLICATIONS

This application is a continuation of U.S. patent application Ser. No. 13/026,035, filed Feb. 11, 2011, which is incorporated herein by reference in its entirety.

TECHNICAL FIELD

The present disclosure generally relates to data processing techniques associated with user-input mechanisms and graphical user interfaces. More specifically, the present disclosure relates to methods and systems for enabling a user of a computing device to navigate a list of items with simple gestures.

BACKGROUND

Advancements in a variety of specific computer-related technologies have given rise to a whole range of new mobile computing devices, including mobile handsets commonly referred to as "smart phones", tablet computers (sometimes referred to as slate computers), and increasingly smaller, more powerful and often less expensive, laptop computers. These new devices very frequently have touch sensitive devices for use as an input mechanism, and in many instances, as the primary input and output mechanism. For instance, in the case of many smart phones and tablet computers, a touchscreen display is frequently used as the primary input/output mechanism. With many new laptops, a touch-based track pad may be used as a mechanism for controlling a cursor or pointing device. Even conventional input mechanisms, such as the computer mouse, are being designed to include touch-sensitive surfaces for receiving user-input. Designing software applications for devices that utilize these touch-based input devices can be challenging, particularly when there is no alternative input mechanism (e.g., conventional mouse or physical keyboard) and the size of the display is small.

DESCRIPTION OF THE DRAWINGS

Some embodiments are illustrated by way of example and not limitation in the figures of the accompanying drawings, in which:

FIG. 2 is a block diagram illustrating a model-view-controller design pattern consistent with a software architecture according to some embodiments of the invention;

DETAILED DESCRIPTION

Figure 1:
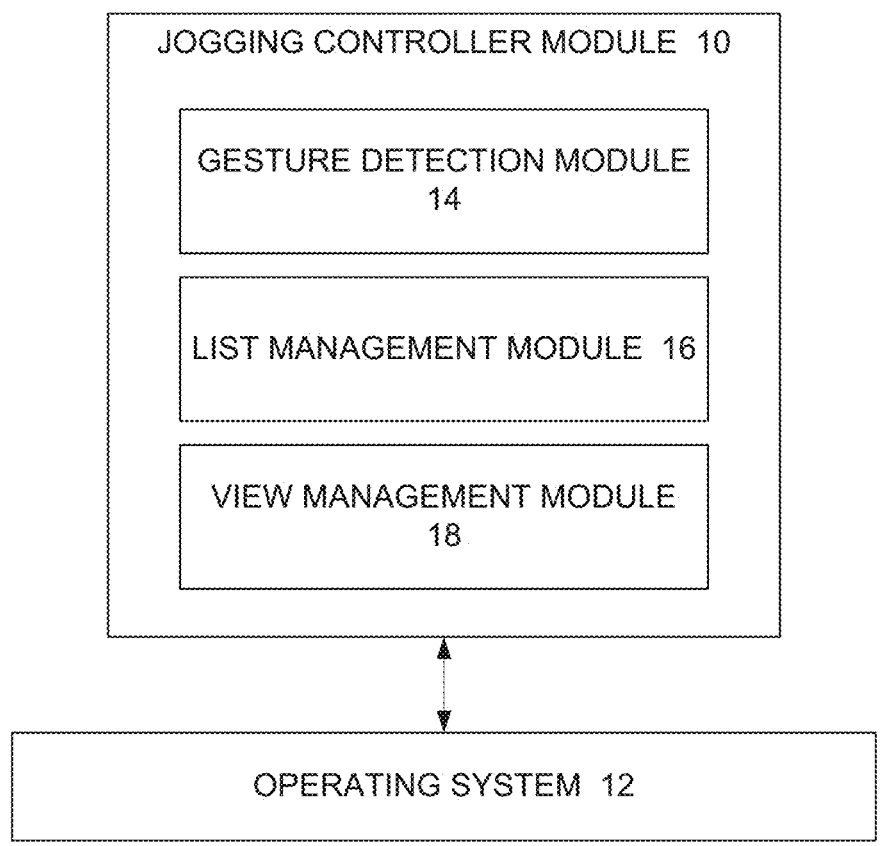
FIG. 1 is a logical block diagram showing a jogging controller module, according to some embodiments of the invention.

The present disclosure describes computer-based methods and systems that enable a user to easily navigate a list of content items with simple gestures. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

For purposes of the present disclosure, the term "computing device" is meant to include desktop computers, laptop or notebook computers, as well as mobile computers in a wide variety of other form factors, including mobile phones (frequently referred to as "smart phones") and other general purpose or application specific computing devices that may lack the phone functionality, such as portable media players, cameras, and global positioning system (GPS) devices. Skilled artisans will immediately recognize that certain mobile computing devices, such as iPhones® and iPod Touch® devices developed by and available from Apple Corporation of Cupertino, Calif., as well as any one of a wide variety of devices based on the Android® operating system developed by Google, Inc. of Mountain View, Calif., fall within the intended definition of a computing device. A great number of other computing devices, with other operating systems, will also be applicable to the inventive subject matter, which is described at length below in connection with the description of the various figures.

Consistent with some embodiments of the invention, a computing device facilitates the ability of a user to navigate a list of content items by performing gestures. More precisely, a computing device enables a user to maintain a view of a particular content item selected from a list of content items, while previewing a second content item that precedes or follows the particular, selected content item in the list of content items. When previewing a content item in the list, the user can perform a gesture to select the content item being previewed, which will cause the newly selected content item to be displayed in place of the previously selected content item. With some embodiments, particularly those that are implemented with a touch sensitive device (e.g., touch screen display or track pad), the motion of the hand gestures that are utilized to navigate the list of content items is similar to the motion one might make when operating a physical jog dial. As such, the gestures are referred to herein as "jog" gestures and navigating or moving up and down in the list of content items can be thought of as jogging through the list.

Consistent with some embodiments of the invention, a computing device displays via a graphical user interface a list of content items (e.g., news articles, emails, music clips or tracks, video clips or tracks, and so on). Each content item in the list of content items has, or is associated with, at least two separate views. The first view, which may generally be referred to as a list view, preview view, or short view, may include identifying information for the content item (e.g., title, subject, brief description, and so forth). This identifying information generally enables a user to identify, or determine at a high level, the subject matter of the content item. The second view, which may be referred to as the summary view, detailed view, or long view, provides a more thorough description of the content item, or in some instances, represents a view of the item in its entirety. For instance, in the context of a list of emails, the list view may include the address or name of the email sender, and a brief subject of the email, while the detailed or summary view includes a view of the entire content of the email. Similarly, in the context of a list of news articles, the list view may include the title of a news article and perhaps a link to the source of the article, while the detailed or summary view includes a brief summary of the news article, or the entire text of the news article. In general, the list view is the view of the content item that is displayed when the content item is displayed in a list with other content items, or is shown as a preview. The detailed view, summary view or long view is the view of the content item that is displayed, for example, after a user has selected the content item from the list of content items.

Consistent with some embodiments of the invention, the computing device enables a user to navigate the list of content items after the user has selected a particular content item from the list of content items, and the detailed or summary view of the selected content item is being displayed. For instance, after a user has selected a particular content item from the list of content items, the computing device will display a detailed or summary view of the selected content item. When the user makes, and the computing device detects, a simple gesture, the computing device will display a preview (e.g., a list view) of the content item that, depending on the gesture, immediately precedes or follows the presently displayed content item, while continuing to display the detailed or summary view of the currently selected content item. For instance, with some embodiments, by pressing a finger to a touch-sensitive input mechanism of the computing device, and then moving the finger in a downward direction, or a left-to-right direction (with respect to the orientation of the display), without lifting the finger from the surface of the touch sensitive input mechanism, the user can obtain a list view of the content item that immediately precedes the content item whose detailed or summary view is presently being displayed. If, for example, the presently selected content item represents the fifth content item in a long list of content items, when the user presses his finger to the touch-sensitive input mechanism and then slides the finger in a downward direction (or, left-to-right direction), a list view of the fourth content item in the list may be displayed. By pressing a finger to a touch-sensitive input mechanism of the computing device and then moving the finger in an upward direction, or a right-to-left direction, the user can obtain a list view of the content item that immediately follows the content item whose detailed or summary view is presently being displayed.

In addition to previewing a content item that either immediately precedes or immediately follows the currently displayed content item, the user can make a jog gesture to jog through the list of content items. For instance, with some embodiments, after pressing a finger to the touch-sensitive input mechanism, and then moving the finger in the downward direction, a list view of the immediately preceding content item is displayed along with the detailed or summary view of the currently selected content item. If the currently selected content item represents the fifth content item in a list of content items, the previewed content item will be the fourth content item. To jog through to the next preceding content item (e.g., the third content item in the list), the user simply performs a simple jog gesture. With some embodiments, a jog gesture involves moving a finger in the upward direction, and then immediately moving the finger in the downward direction back to the starting position without lifting the finger from the surface of the touch-sensitive input mechanism. Alternatively, a jog gesture may be performed by moving a finger from left to right, and then back to the starting position, from right to left. When the computing device detects the jog gesture, the display is dynamically updated to show a list view of the next preceding content item in the list of content items—for instance, in this example, a list view of the third content item in the list will be displayed. As will be described in greater detail below, each jog gesture may be directional, such that an up-then-down gesture jogs through the list in a first direction, while a down-then-up gesture jogs though the list in a second direction. Similarly, with embodiments using a landscape orientation, a finger motion from right to left, and then back from left to right may jog in a first direction, while the opposite finger motion—that is, from left to right, and then back from right to left to the starting position—will jog through the list in the opposite direction. In this manner, navigation—that is, jogging up or down (or, left or right) within the list of content items to preview content items in the list—is made possible, while simultaneously displaying a detailed view of a selected content item. Advantageously, with embodiments of the invention, navigation of the list of content items is made possible without requiring the user to return to a list view of the content items (i.e., a view of the content items in a list, such that each content item is shown in list view.) Other aspects of the present inventive subject matter, including other example gestures, will be readily apparent from the description of the figures that follow.

FIG. 1 is a block diagram view of a jogging controller module 10, which operates on or with a computing device, to enable the navigation of a list of content items, according to some embodiments of the invention. In various embodiments and as described in greater detail below, the jogging controller module 10 is implemented as a combination of software and hardware components (e.g., as a processor configured by executable instructions, or software), or in some instances, with customized hardware components (e.g., application specific electronic circuitry). As illustrated in FIG. 1, the jogging controller module 10 operates in conjunction with an operating system (OS) 12 of a computing device. With some embodiments, the jogging controller module 10 uses one or more sets of application programming interfaces (API's) that are part of the OS to leverage functionality of the device on which the OS is executing. For instance, the gesture detection module 14 may make use of one or more gesture API's to detect the occurrence of certain events, representing gestures, on a touch screen display or touch-based track pad of the mobile device. Similarly, one or more API's may be leveraged to facilitate the display of various graphics and animations, including content items and lists of content items, and so forth.

As shown in FIG. 1, in addition to a gesture detection module 14, the jogging controller module 10 includes a list management module 16 and a view management module 18. In general, as the gesture detection module 14 identifies or detects the occurrence of certain gestures, these gesture events trigger the list management module 16 to update indices used to keep track of content items in a list. Specifically, with some embodiments, separate indices are used to track the currently displayed content item, a preceding or previous content item and a following or next content item, where the preceding (or, previous) and following (or, next) content items precede or follow the currently selected content item in the list of content items. For instance, when a user initially selects a content item from a list of content items, a detailed or long view of the selected content item will be displayed. Accordingly, the index associated with the current view will be set to correspond with the selected content item in the list. For example, if the selected content item is the fifth content item in a long list of content items, the index associated with the current view will be set to five, to reflect the selection and display of the fifth content item.

While the currently selected content item is being displayed, a user may perform a series of jog gestures to navigate in an upward direction in the list (e.g., navigating from content item five, to four, then three, and so forth). With each jog gesture, a preview or list view of a preceding, or following (depending upon the gesture) content item is shown. With some embodiments, the preview or list view of the preceding or following content items will be displayed in a position relative to the detailed view of the currently selected content item, such that the position indicates the direction of the previewed content item in the list of content items relative to the currently selected content item. For instance, if a user jogs up a list (or, to the left in a list), moving from content item five, to four, then three, and so on, the preview or list view of the preceding content items may be presented on top of, or to the left of, the detailed view of the currently selected content item, thereby indicating to the user the position of the previewed content item in the list of content items relative to the currently selected content item. Similarly, if the previewed content item is a content item that follows the currently selected content item in the list of content items, then the list or short view of the previewed content item may appear at the bottom, or to the right, of the detailed or long view of the currently selected content item.

As the jog gestures are detected and the preview or list views of the content items are displayed, the list management module 16 updates an index used to keep track of the preceding or previous content item that is being previewed. For instance, with the detection of each jog gesture representing movement in the upward direction of the list of content items (e.g., from content item five, to four, to three, and so forth), the index corresponding with the previous object or view will be decremented to correspond with the content item that is currently being previewed. If and when the user performs a particular gesture to select a content item that is being previewed, the currently selected content item—which is being displayed with a summary or long view—will be replaced with a summary or long view of the newly selected content item. In addition, the list management module 16 will update the indices so that the index for the preceding or previous item is set to the content item immediately preceding the newly selected content item, and the index for the following or next content item is set to the content item that immediately follows the newly selected content item.

The view management module 18 operates in conjunction with the list management module 16 to manage the various views of the different content items as a user is navigating a list of content items. For instance, the view management module 18 operates to ensure that the proper view of each content item is presented on the display as a user performs the various gestures and jogs up, and/or down, the list of content items. With some embodiments, as the views change in response to the computing device detecting different gestures made by the user, the views will dynamically change in an animated manner. For instance, with some embodiments, as a user presses his finger to a touch screen display and then slides his finger in an up or down direction, the list view of the content item immediately preceding or following the currently selected and displayed content item will appear to move or slide into a position immediately adjacent the summary or long view of the currently selected and displayed item, such that the movement closely parallels the movement of the user's finger on the touch screen display, almost as if the user is pulling the preview or list view of the content item onto the display. Similarly, as a user performs a jog operation, the list management module 16 may animate the display of the transition of the content item being previewed.

FIG. 2 is a block diagram illustrating a model-view-controller design pattern consistent with an example software architecture according to some embodiments of the invention. As illustrated in FIG. 2, the software architecture is represented with a data model 20, controller 22 and view 24. Consistent with the data model 20 shown in FIG. 2, each of three objects is associated with a view, an index and several functions or methods, collectively encompassing a jogging protocol 32. For example, the previous object, with reference number 26, is associated with the previous view 34, and the index, INDEX I, while the current object 28 and next object 30 are respectively associated with the current view 36 and next view 38, and INDICES J and K. Accordingly, the index for the current object will correspond with the currently selected content item in a list of content items. For example, if the currently selected and displayed content item is the fifth content item in a list, the index, INDEX J, will be set to five. Each of INDICES I and K will be incremented or decremented in response to the detection of certain jog gestures. For instance, if a user performs a series of jog gestures representing jog operation up the list (e.g., from five, to four, then three, and so forth), INDEX I will be decremented accordingly. When a user selects a content item that is being previewed, all three indices are reset, such that the index corresponding with the current view (i.e., INDEX J) is set to correspond with the newly selected content item, and the INDICES I and K are set to be one greater and one lower, respectively. For example, if a user navigates from the fifth content item to the third content item, and then selects the third content item to view a detailed view of the third content item, INDEX I would be set to two, INDEX J would be set to three, and INDEX K would be set to four.

As illustrated in the controller 22 portion of this example software architecture, the jogging controller 40, in response to detecting certain jogging gestures made by a user, invokes a particular protocol command on a specified data delegate. For instance, when processing a list of content items and a jog (down) gesture is detected, the jogging controller 40 determines whether a next content item in the list exists (e.g., by calling "hasNextObject"), and then assigns to the field, NextObject 42, the value returned by the function or method represented in FIG. 2 by the function or method, "getNextObjectQ" 44. In this manner, the jogging controller 40 manages the mapping and management of objects to indices as jogging and selection gestures are detected.

Finally, the view 24 portion of the model-view-controller design pattern illustrates an example of the various views that may be presented while navigating a list, according to some embodiments of the invention. For example, a detailed or long view of the current object 48 is displayed while a list view of the previous object 46, or next object 50, are dynamically updated based on the detection of jogging gestures. When a gesture representing the selection of a previewed object is detected, the current object is updated to reflect the view of the newly selected object, and the indices of all objects are updated, such that the index of the previous object is set to be one less than the index for the current object, and the index for the next object is set to be one greater than the index for the current object. In the views presented in FIG. 2, the previewed content items appear above or below the detailed view of the currently selected content item. This might be thought of as a portrait orientation or mode of operation. With some embodiments, a landscape orientation or mode of operation is possible, such that the previewed content items will appear generally to the left or right of the currently selected content item.

Figure 3:
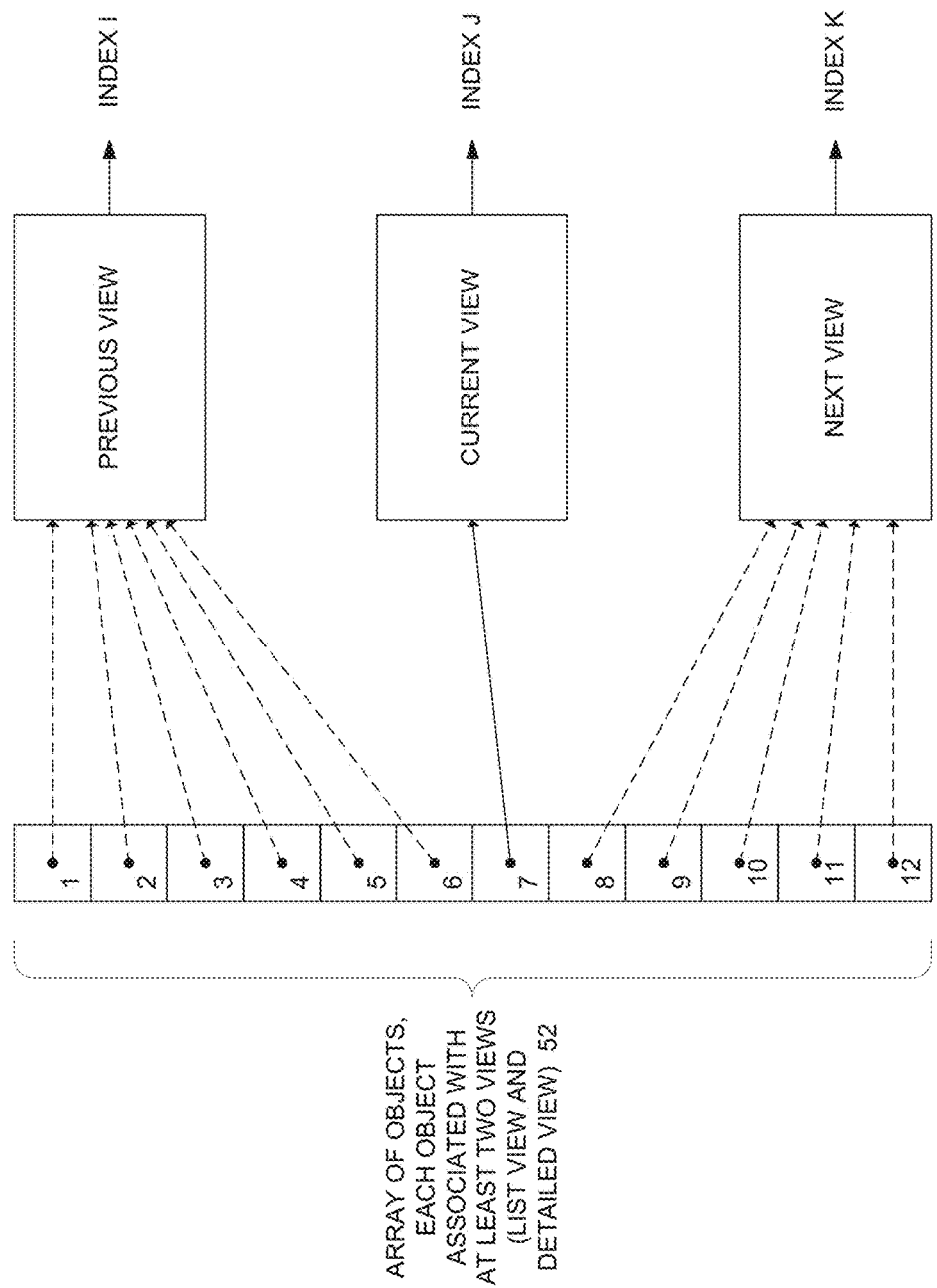
FIG. 3 is a block diagram illustrating an array of objects representing a list of content items, consistent with some embodiments of the invention.

FIG. 3 is a block diagram illustrating an array of objects 52 representing a list of content items, consistent with some embodiments of the invention. As illustrated in FIG. 3, three views are associated with three indices. Initially, the index for the current view is set to seven (e.g., INDEX J=7), to indicate that the currently selected and displayed content item corresponds with content item seven in the list of content items. Similarly, the indices for the previous view and next view will be one less, and one greater, respectively (e.g., INDEX I=6 and INDEX K=8). As a user performs jog gestures and jogs up the list, the value of the index corresponding with the previous view (i.e., INDEX I) is decremented as content items are previewed in the display. For instance, after a user has jogged in the upward direction three times, the index, INDEX I, will be decremented from six to four. If the user performs a particular gesture representing a selection of the content item being previewed, then the indices are reset to correspond with the new value of the index for the current view. For instance, if the user is previewing the fourth content item in the list while the detailed view of the seventh content item is being displayed, by selecting to view a detailed view of the seventh content item, the indices for the previous view and the next view will be reset to be one less, and one greater than the new index for the current view. In this example, upon selecting to view the detailed or long view of the fourth content item, INDEX I would be reset to three, INDEX J to four, and INDEX K to five.

Figure 4:
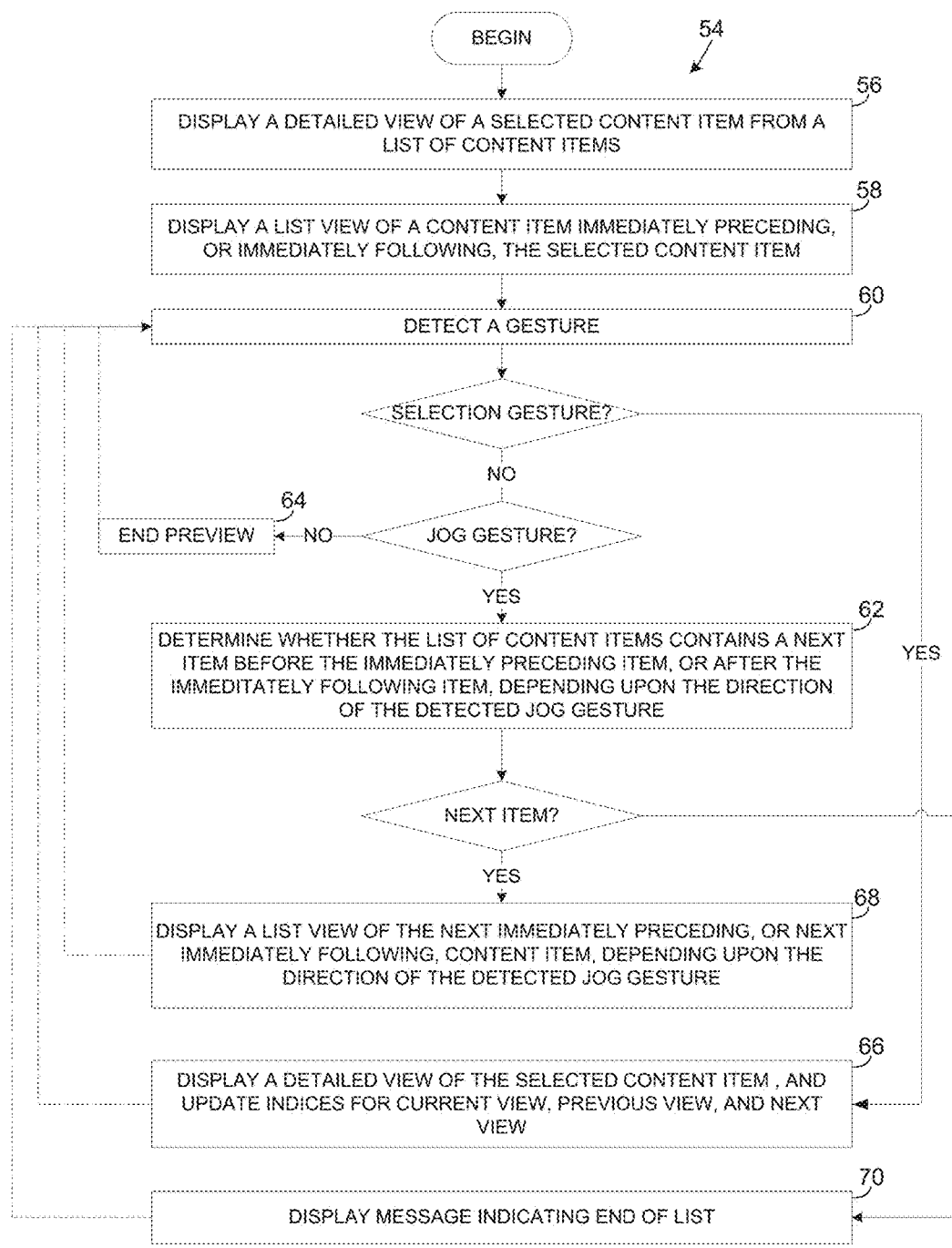
FIG. 4 is a flow diagram illustrating an example method for use in facilitating the navigation of a list of content items, according to some embodiments of the invention.

FIG. 4 is a flow diagram illustrating the method operations involved in a method 54 to facilitate the navigation of a list of content items using gestures, consistent with some embodiments of the invention. The method begins when, at method operation 56, a computing device displays a detailed view of a content item selected from a list of content items. For example, a user may select an email from a list of emails, or a news article from a list of news articles, or any other type of content that might be organized into a list. In response to detection of the selection, the computing device displays a detailed or long view of the selected content item.

Next, at method operation 58, the computing device displays a preview (e.g., a list view or short view) of a content item that immediately precedes, or immediately follows the selected content item for which a detailed view is being displayed. For example, a user may perform, and the computing device may detect, a first gesture representing a command or request to view a preview or list view of a content item immediately preceding or following the currently selected and displayed content item. The gesture may be performed by simply pressing a finger to a touch-enabled device, and moving the finger in one direction or the other, where the direction indicates whether a preceding or following item is to be previewed.

Next, at method operation 60, the computing device detects a second gesture. If the second gesture is determined to be a selection gesture, at method operation 66 the computing device displays a detailed view of the selected content item (e.g., the content item that had been previewed), and then updates the indices associated with the current view, the next view, and the previous view, as described in connection with FIG. 3. However, if the detected gesture is not a selection gesture, the computer determines whether the gesture is a jog gesture. If a jog gesture is detected, at method operation 62 the computing device determines whether the list of content items contains a next content item before the immediately preceding content item, or after the immediately following content item, depending on the direction of the jog gesture. For instance, if the currently selected and displayed content item is the second in the list, and the first content item is being previewed, if the user attempts to preview the content item before the first content item, there is no existing content item in the list to be displayed. Accordingly, if no next item exists, at method operation 70 a message is displayed to indicate that further navigation in the desired direction is not possible because the end of the list has been reached.

If there is a next item in the list in the particular direction indicated by the detected jog gesture, then at method operation 68 the computing device updates the view of the previewed content item to display the next immediately preceding or next immediately following content item in the list, depending on the direction of the detected jog gesture. For example, if the currently selected content item is the third content item in the list, and the currently previewed content item is the fourth content item, when the user performs a jog gesture to view the next following content item (e.g., the fifth content item in the list), the display of the previewed content item is updated to replace the fourth content item with the fifth content item. In addition, the corresponding index is incremented or decremented to correspond with the currently previewed content item. If the gesture is determined not to be a selection gesture, or a jog gesture, then at method operation 64, the currently displayed preview of the immediately preceding or following content item is ended leaving only a detailed view of the currently selected content item.

Figure 5:
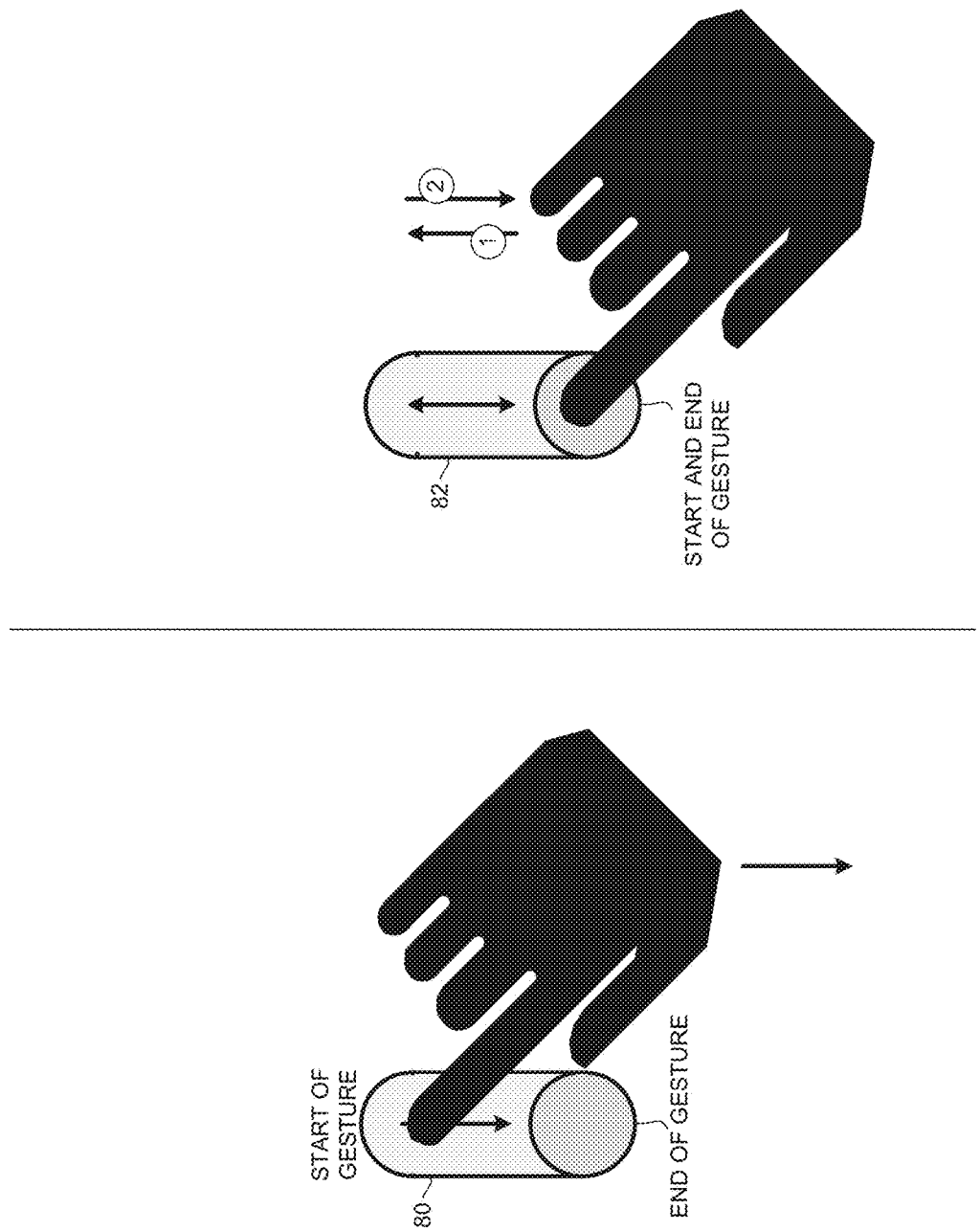
FIG. 5 is a legend view of two hand gesture symbols, illustrating an example of the motion a user might make with his finger and hand to perform certain gestures for use with some embodiments of the invention.

FIG. 5 is a legend view of two hand gesture symbols 80 and 82 used herein to illustrate examples of the motion a user might make with his hand, and specifically his finger, to perform certain gestures for use with some embodiments of the invention. These gestures are representative of the many types of gestures that could be used with different embodiments of the invention. Moreover, these gestures, or variations of these gestures, might be used with a touch screen display, a touch-sensitive track pad, or any other touch-enabled input mechanism. In the many examples presented herein, the gestures that are described are hand gestures that are detected by a touch sensitive device, such as a touch screen display, or a track pad. However, in alternative embodiments, other gesture sensing components may be used to detect a variety of gestures other than those specifically described in the examples presented herein. For instance, with some embodiments, a computing device may include one or more image sensing devices that are utilized with a computer vision system that enables the detection of non-touch gestures. Similarly, a pen, stylus, computer mouse, or other pointing device may be used to make and/or detect different gestures, consistent with embodiments of the invention.

As illustrated in the left portion of FIG. 5, the gesture symbol with reference number 80 represents a hand gesture made by a user when the user simply presses his finger to a touch-sensitive device, and then moves his finger in a downward direction. In this example, at the end of the gesture, the user continues to hold his finger to the touch-sensitive device. With some embodiments, lifting a finger from a touch-sensitive device may be part of a gesture, or a separate and individual gesture. The example gesture illustrated in the left portion of FIG. 5 may be used to display a preview or list view of a content item that precedes a currently displayed content item. For example, while viewing a detailed or long view of a currently selected content item, if a user performs the gesture illustrated in the left portion of FIG. 5, a preview or list view of the content item that immediately precedes the currently displayed content item may be shown. Of course, performing this gesture in the opposite direction (i.e., in an upward direction) will in some embodiments cause the list to be navigated in the opposite direction, showing the immediately following content item. Similarly, when operating in a landscape orientation or mode, the gesture represented by the gesture symbol with reference number 80 may be performed in a horizontal orientation, for example, by moving a finger from left to right, or right to left.

In the right portion of FIG. 5, a second gesture symbol 82 is shown. This gesture symbol represents a jog gesture used with some embodiments of the invention. For instance, to perform this jog gesture, the user starts with his finger held against the touch-sensitive device, and then simply moves his finger first in an upward direction, and then back down to the very position at which the gesture started. With some embodiments, this jog gesture 82 is used to jog through the list of content items. For example, if a user first performs the gesture represented by the gesture symbol 80 on the left portion of FIG. 5, the content item that immediately precedes the currently selected and displayed content item will be previewed. To jog through to the next immediately preceding content item, the user simply performs the jog gesture represented by the gesture symbol 82 in the right portion of FIG. 5. Again, performing the same gesture in the opposite direction will, in some embodiments, cause the list of content items to be navigated in the opposite direction. Similarly, the gesture represented by gesture symbol 82 might be used in a landscape orientation or mode, such that the movement of the finger is lateral, from left to right and right to left.

Figure 6:
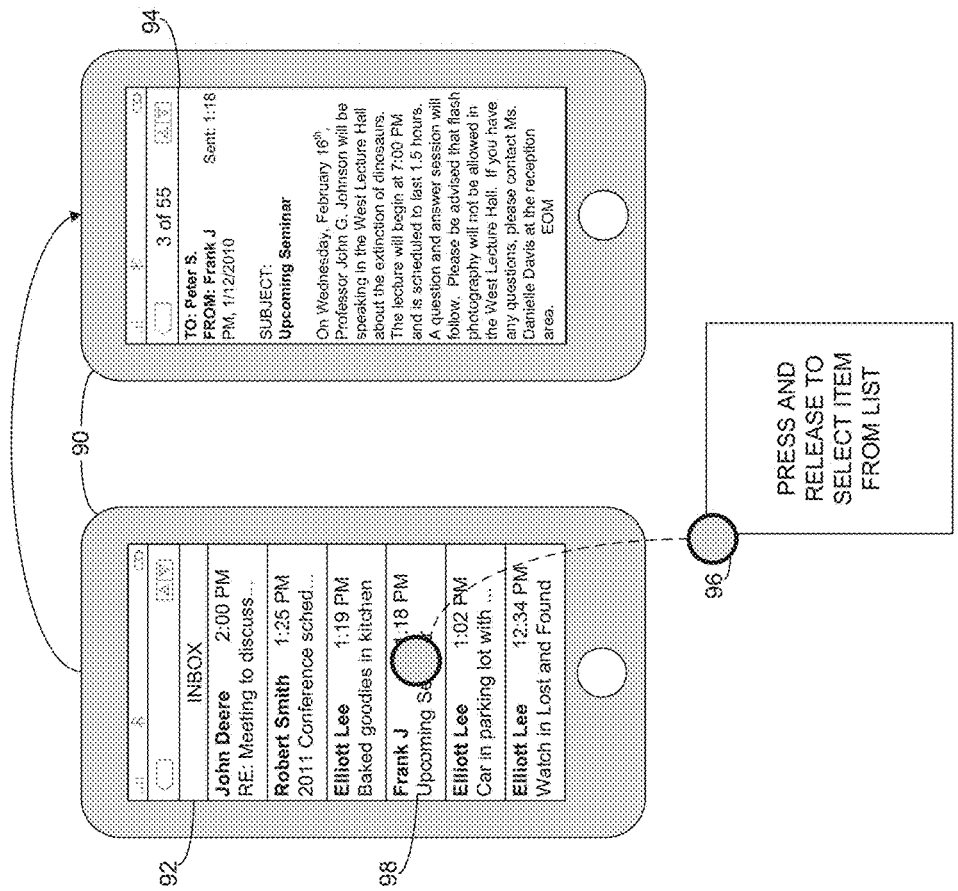
FIG. 6 through 12 are diagrams illustrating example user interface views, and the transition of user interface views that occurs in response to the detection of certain gestures, consistent with some embodiments of the invention.

FIG. 6 is a front view of a mobile computing device 90, with a touch screen display, consistent with some embodiments of the invention. More specifically, FIG. 6 illustrates the transition of user interface views that occurs in response to a mobile computing device detecting a gesture that represents a selection of a particular content item (e.g., an email) in a list of content items. In the first view, with reference number 92, the touch screen display of the mobile computing device is displaying a list of content items— specifically, a list of emails that have been received and are in an inbox of a user. To scroll up or down in the list, the user can perform certain gestures, such as pressing a finger to the touch screen display, and then moving the finger up or down in a swiping or sliding motion. To select an email from the list of emails, a user performs a selection gesture, which is represented in FIG. 6 by the circular gesture symbol with reference number 96. This gesture symbol represents a gesture performed by pressing a finger at the location specified by the circular gesture symbol 96, and then releasing the finger to make the selection of the email. In this example, the email with reference number 98 is selected as a result of the gesture 96. Accordingly, the user interface view 94 on the mobile computing device 90 after selection of the email 98 is a detailed view of the selected email 98. Stated differently, when the computing device detects selection of the particular email 98 via the selection gesture 96, the computing device changes the display from the first user interface view 92, showing the list of emails, to the second user interface view 94, showing a detailed or long view of the selected email 98.

Figure 7:
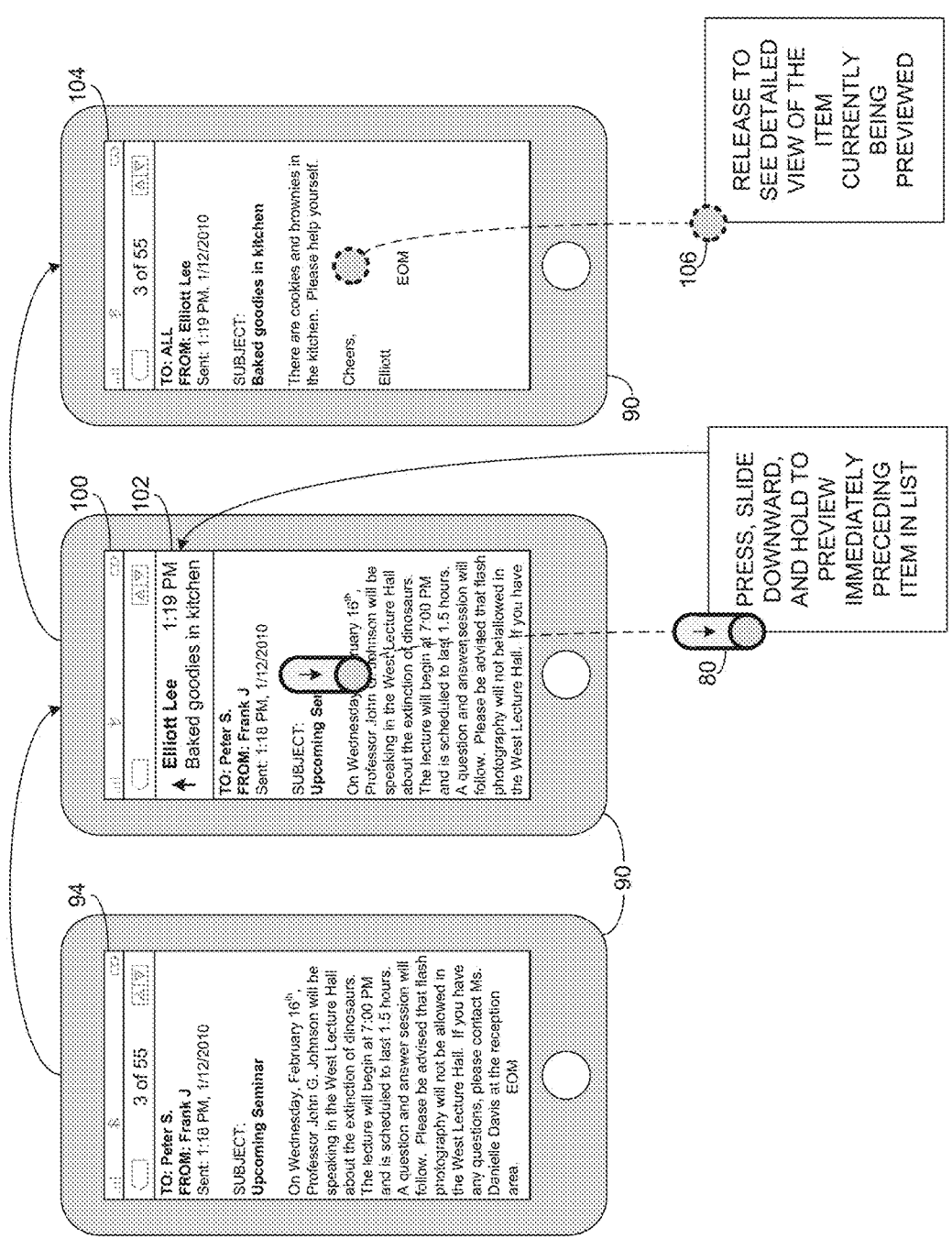

Turning now to FIG. 7, the computing device 90 is shown again. In FIG. 7, the user interface view with reference number 94 represents the detailed view of the currently selected email (e.g., selected from the list of emails shown in user interface view 92 in FIG. 6). Referring now to the user interface view with reference number 100, when a user performs the gesture represented by the gesture symbol 80, a preview or list view of the email that immediately precedes the selected email (i.e., email 98) in the list of emails (e.g., presented in user interface view 92 in FIG. 6) is displayed. This preview or list view of the immediately preceding email is shown with reference number 102 in user interface view 100. With some embodiments, the list view of the immediately preceding email is presented as an animation, such that it appears to slide down adjacent to the currently selected email with the motion of the user's finger, almost as if the user was pulling the user interface down to view the next item (i.e., the preceding email) in the list. With some embodiments, the detailed view of the currently selected content item (e.g., email) moves in unison with the list or preview view of the immediately preceding (or following) content item.

With some embodiments, after performing the gesture represented by the gesture symbol with reference number 80, a user can simply release his finger (e.g., lift the finger from the touch screen device) to select the email that is being previewed. For instance, in user interface view 104, the gesture symbol with reference number 106 represents a user lifting his finger from the touch screen display after having performed the gesture represented by the gesture symbol with reference number 80. By lifting his finger, the user is selecting the previewed email 102, which is then shown in a detailed view in the user interface with reference number 104. If the user desires instead to continue viewing the currently selected email, rather than lift his finger, the user can slide his finger back to the starting position of the gesture represented by gesture symbol 80, as if to push the previewed email in an upward direction. The result of such a gesture would be the user interface view with reference number 94.

Figure 8:
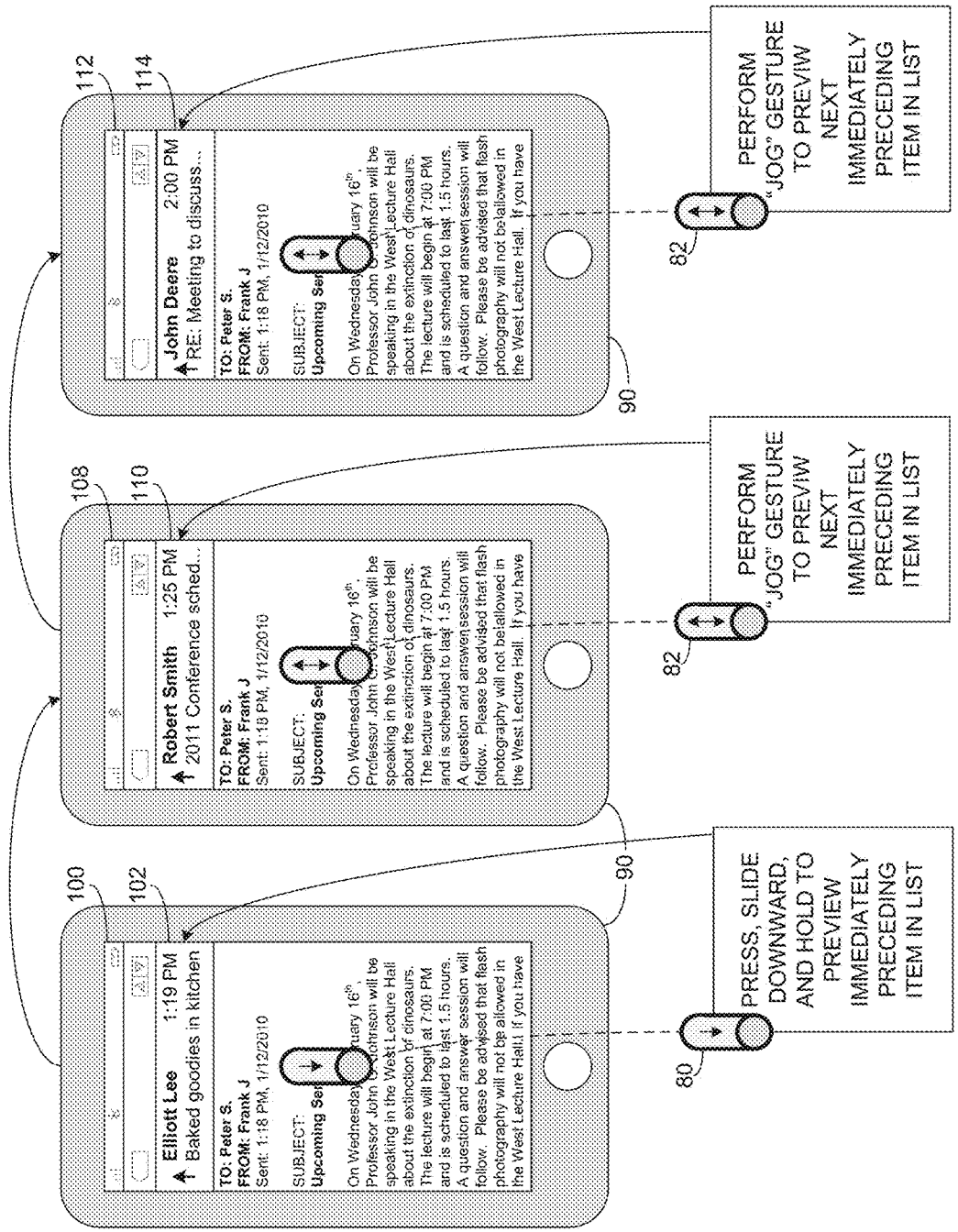

Turning now to FIG. 8, the mobile computing device 90 is shown again. In FIG. 8, the transition of user interface views that occurs when a user performs a jog gesture is shown. For instance, the user interface view with reference number 100 represents the user interface view that is displayed after the user has performed the gesture associated with gesture symbol 80. For instance, after pressing his finger to the screen and then sliding his finger in a downward direction (relative to the top of the touch screen display), and then holding his finger to the screen, the preview or list view of the immediately preceding email is shown, as indicated by reference number 102 in the user interface view with reference number 100.

Next, as shown in the user interface view with reference number 108, the user performs a jog gesture as represented by the gesture symbol with reference number 82. For example, with some embodiments, a jog gesture is performed by continuously holding or pressing a finger to the touch screen display, and then moving the finger in a first direction (e.g., up), and then in the opposite direction (e.g., down). As illustrated in FIG. 8, performance of the jog gesture causes the email that is being previewed (e.g., preview view of email 110) to be dynamically updated with the next preceding email in the list of emails (e.g., the list presented in user interface view 92 in FIG. 6). Here again, the presentation of the previewed content item may be animated to correspond with and reflect the motion of the user's finger. For instance, the list or preview view of the email may slide up and down with the motion of the user's finger as the user performs the jog gesture. The updated list or preview view of the email is shown in FIG. 8 with reference number 110 in the user interface view with reference number 108.

In the user interface view with reference number 112, the user repeats the jog gesture represented by gesture symbol 82, and the list view of the previewed email is updated to show the next immediately preceding email in the list of emails. This previewed email is shown in FIG. 8 with reference number 114. To select the presently previewed email, the user simply lifts his finger from the touch screen display after performing the jog gesture represented by gesture symbol 82. In this manner, while maintaining a view of the presently selected email (e.g., email 98 in FIG. 6), the user can jog through the list of emails and select a previewed email of interest.

Figure 9:
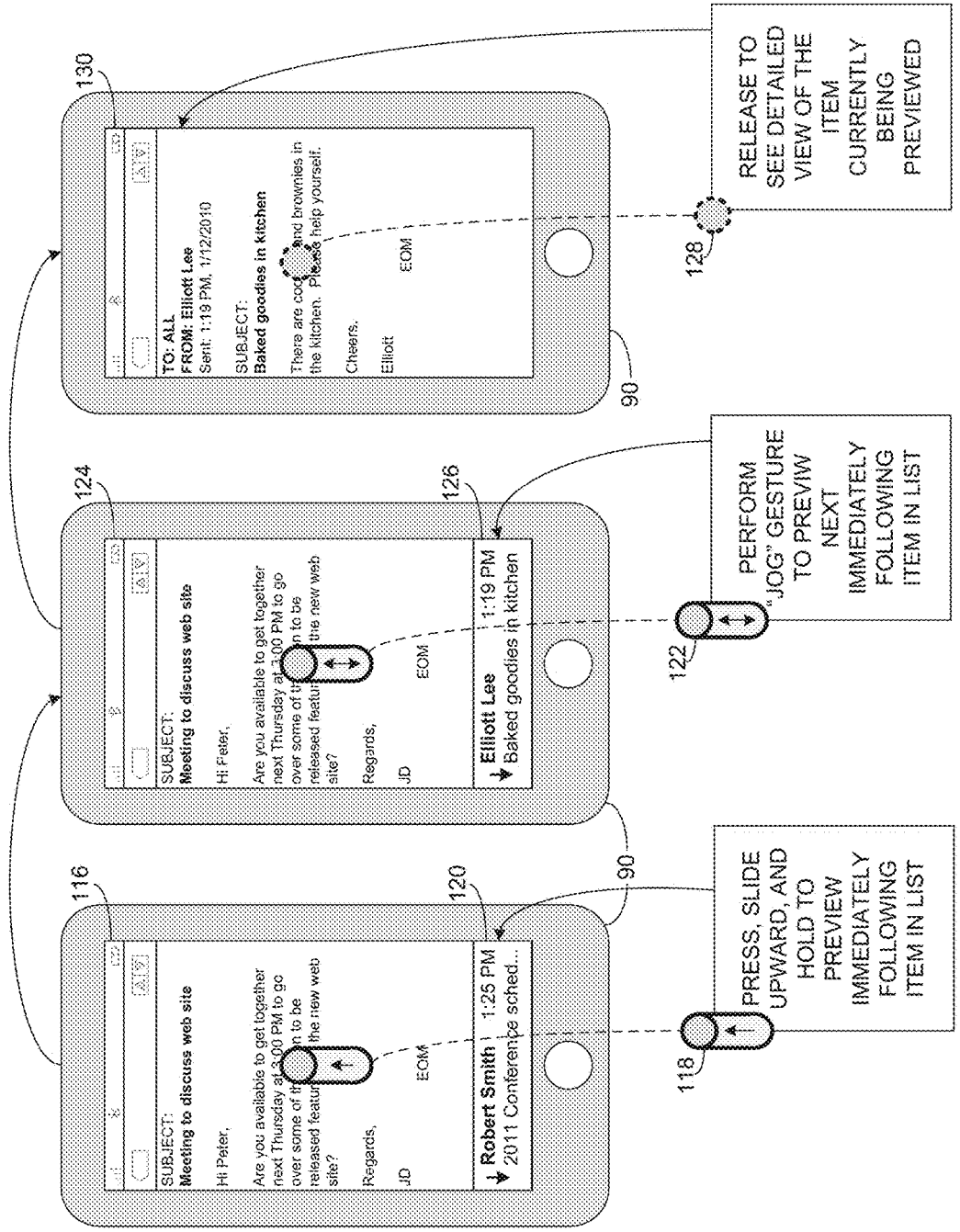

Turning now to FIG. 9, the mobile computing device 90 is shown again and illustrates an example of the user interface view transitions that occur when a user is jogging through the list of emails in the other direction—that is, to preview emails that follow the presently selected email in the list of emails. As shown in the user interface view with reference number 116, a user has performed a gesture represented by the gesture symbol 118. Specifically, the user has pressed a finger to the touch screen display, and then moved his finger in an upward direction, thereby revealing a list or preview view of the email that immediately follows the presently selected and displayed email, in the list of emails. This previewed email is shown with reference number 120 in user interface view 116.

To view the next immediately following email in the list of emails, the user performs the jog gesture represented by the gesture symbol 122 shown with respect to the user interface view with reference number 124. Performance of the jog gesture causes the mobile computing device to update or refresh the previewed email with the next immediately following email in the list of emails. This previewed email is shown with reference number 126 in the user interface view with reference number 124.

Finally, to select the previewed email (e.g., the email shown in list view 126 in user interface view 124), the user simply lifts his finger from the touch screen display, as represented by the gesture symbol with reference number 128 in the user interface view with reference number 130, after completing the gesture represented by gesture symbol 122. The result of this gesture 128 is a detailed view of the selected email, as shown in the user interface view with reference number 130.

Figure 10:
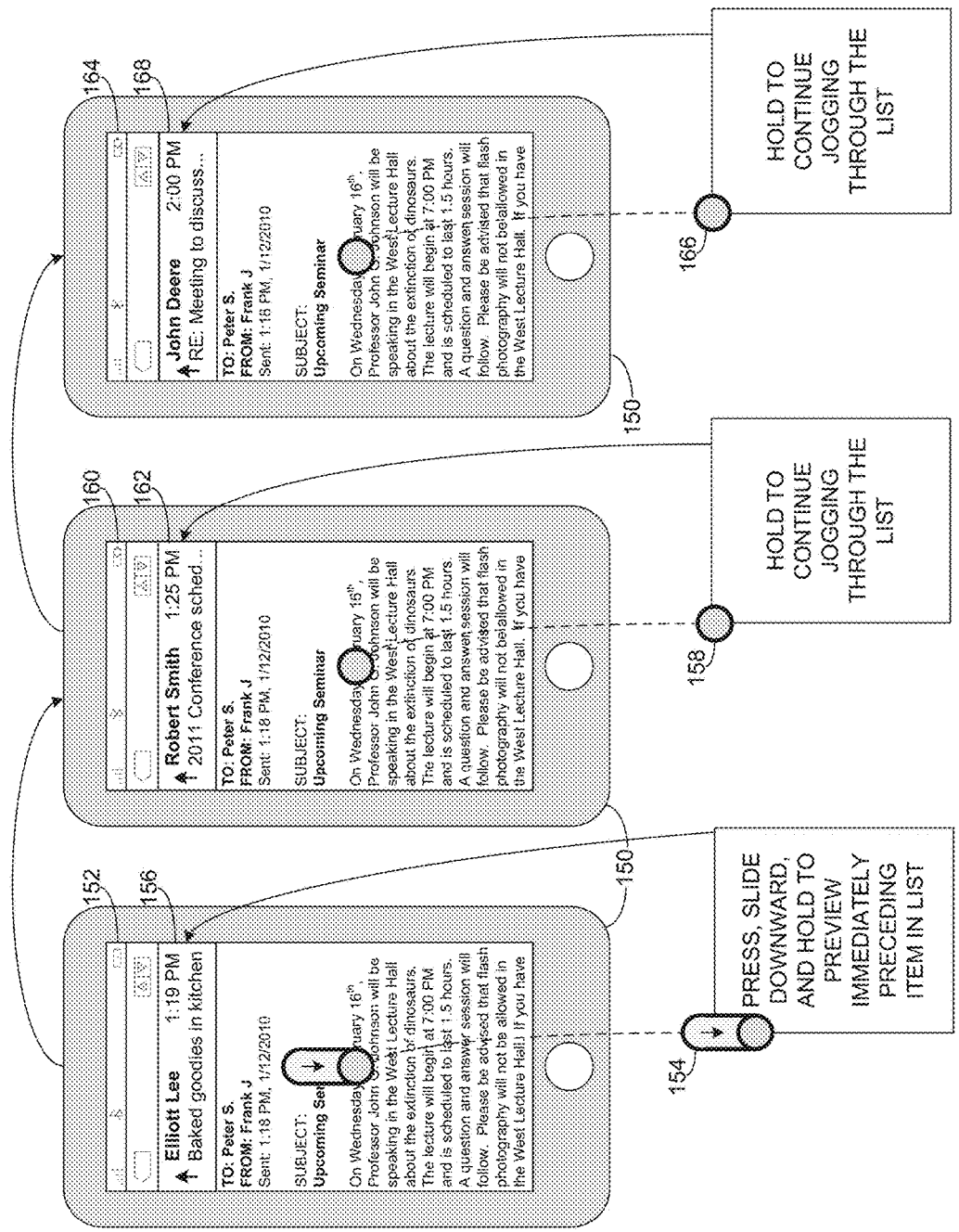

FIG. 10 is a front view of a mobile computing device 150, with a touch screen display, consistent with some embodiments of the invention. FIG. 10 illustrates a computing device capable of detecting an alternative gesture for use in navigating a list of content items (e.g., emails), consistent with some embodiments of the invention. With some embodiments, a user can simply press his finger to the touch screen display, and then slide his finger in an upward or downward direction to preview immediately preceding, or following, content items. For instance, referring to the user interface view with reference number 152, when a user performs the gesture represented by the gesture symbol with reference number 154, the computing device will present a preview or list view of a content item that immediately precedes the content item that is currently being displayed. This preview of the immediately preceding email is shown with reference number 156 in the user interface view with reference number 152.

If the user continues to hold his finger still and in place on the touch screen display, as represented by the gesture symbol with reference number 158 in user interface view 160, the computing device will periodically refresh the display of the previewed email 162 to show the next immediately preceding email in the list of emails. As shown in the user interface view with reference number 164, as the user continues to hold his finger on the touch screen display, as represented with gesture symbol 166, the computing device continues to jog through the list and update the view of the previewed email 168. To select a content item being previewed, the user simply lifts his finger when the content item is being previewed. This results in a selection of the content item being previewed, and in turn, the selected item being displayed in a detailed view. If the user would like to end previewing of the emails, the user simply moves his finger to the starting position of the gesture represented by gesture symbol 154.

With some embodiments, the rate at which the computing device updates or refreshes the view of the previewed content items increases in correlation with the length of time that the user holds his finger to the touch screen device. For example, as the duration of time for which the user has held his finger to the touch screen display increases, the rate at which previewed items are displayed and refreshed increases. This allows a user to rapidly navigate through an extremely long list of content items.

Figure 11:
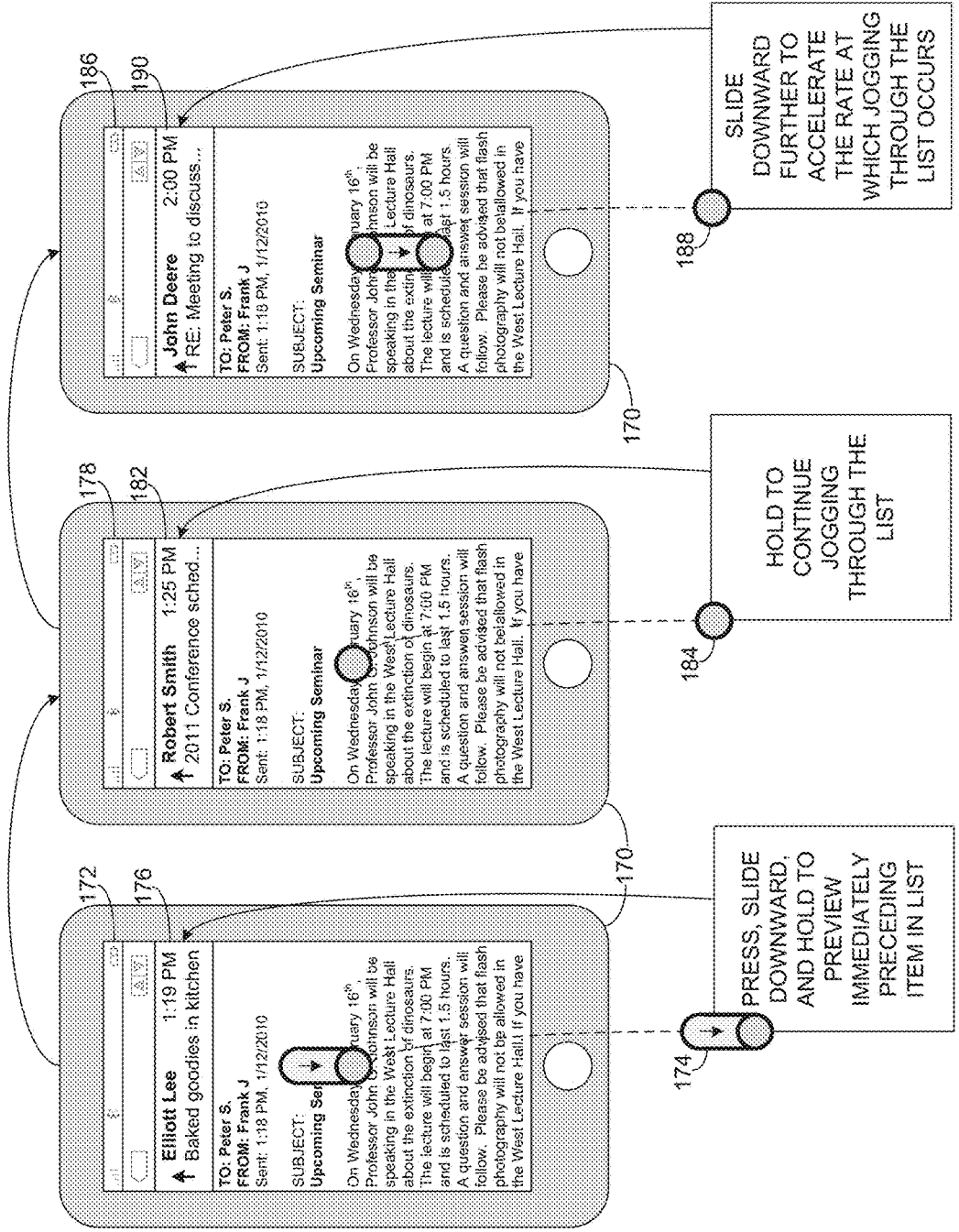

FIG. 11 shows yet another example of a gesture for navigating a list of content items, which might be used with a computing device according to embodiments of the invention. With some embodiments, the speed or rate at which the computing device updates or refreshes the views of previewed content items increases in correlation with the distance or length of the motion made by the user's finger, and detected by the computing device. For example, referring to the computing device with reference number 170 in FIG. 11, the user interface view with reference number 172 shows a gesture symbol 174 representing a gesture made by a user. Specifically, the gesture involves a user placing a finger on the touch screen display, and then moving his finger downward a first distance, and then holding his finger to the touch screen display. The computing device 170 detects the gesture and in response, displays a list or preview view of the immediately preceding content item in the list of content items (e.g., the list view of the email with reference number 176.) As the user simply holds his finger in place, the computing device will automatically continue to jog through the list, updating or refreshing the view of the previewed email. For example, in the user interface view with reference number 178, the view of the previewed email 182 is updated as the user performs the gesture represented by the gesture symbol with reference number 184. The rate at which the computing device refreshes or updates the view of the previewed emails depends on the distance of the motion made by the user's finger when the user makes the gesture. Accordingly, as shown with respect to the user interface view with reference number 186, if the user moves his finger an additional distance in the downward direction, as represented by the gesture symbol with reference number 188, the rate at which the computing device jogs through the list and updates or refreshes the view of the previewed content items 190 will increase. Accordingly, a user can slide his finger back and forth on the touch screen display to control the rate at which the jogging of content items occurs. With some embodiments, the rate at which the computing device jogs through the list may be dependent on a combination of the distance of the motion made by the finger and detected by the computing device, and the length of time that the user has held his finger in place.

Figure 12:
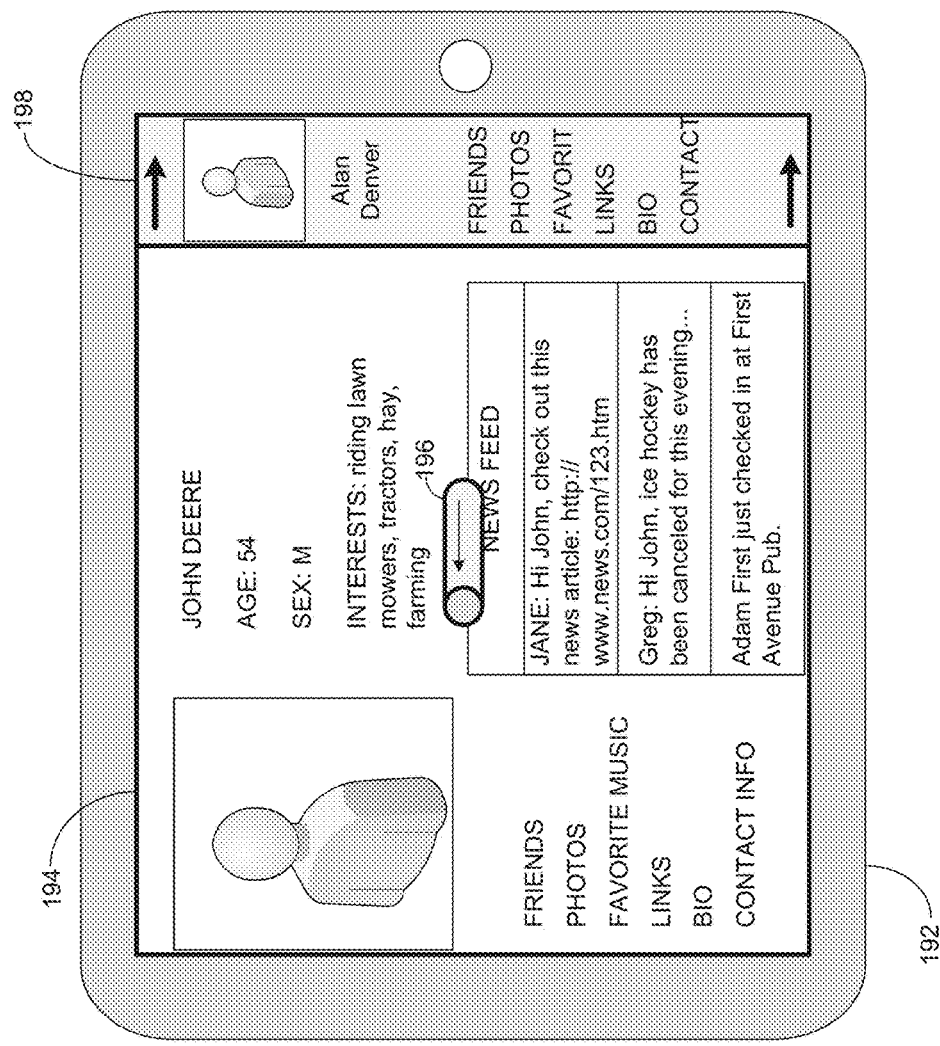

FIG. 12 is a font view of a tablet computing device 192, with which an embodiment of the invention might be implemented. In the previously presented examples, the user interface views were generally shown in a portrait orientation or operating mode. However, with some embodiments, the user interface views may be in landscape orientation. Accordingly, FIG. 12 illustrates an example of a user interface view for a social or business network application, in which a user's profile page is displayed. For example, the user interface view with reference number 194 is showing a user profile page for a user by the name of John Deere. The gesture symbol with reference number 196 indicates that a user has pressed a finger to the touch screen device of the tablet 192, and then moved his finger to the left side of the display. Upon detecting the gesture, the tablet computing device 192 has displayed a preview 198 of the profile page for the next user, by the name of Alan Denver. As such, skilled artisans will recognize that the application of the inventive concepts described and presented herein may extend beyond the specific examples presented herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 13:
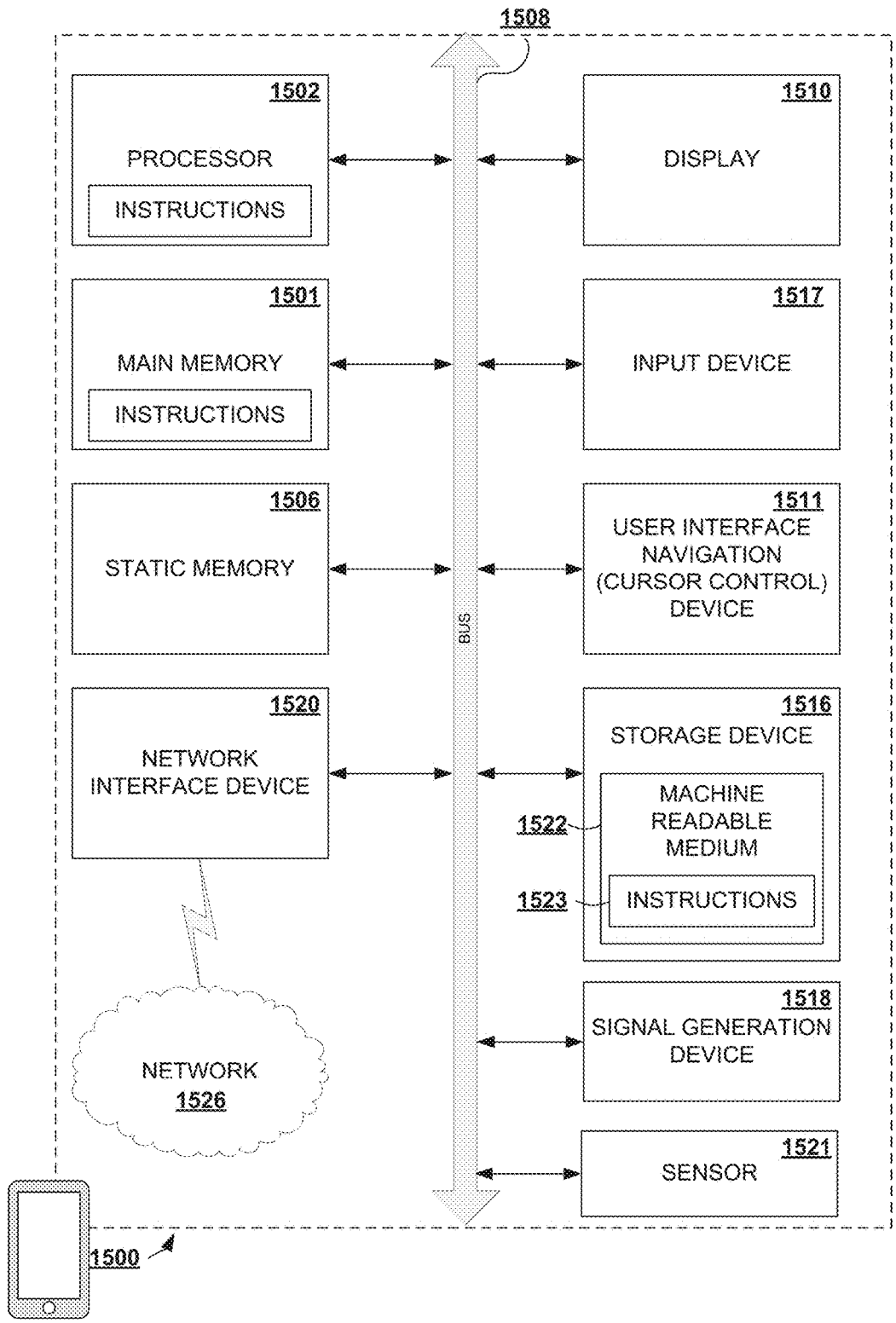
FIG. 13 is a block diagram of a machine in the form of a computing device within which a set of instructions, for causing the machine to perform any one or more of the methodologies discussed herein, may be executed.

FIG. 13 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. In particular, plural instances may be provided for components, operations or structures described herein as a single instance. Furthermore, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method to enable navigation of a list of content items, each content item in the list having a list view and a detailed view, the method comprising:
    while displaying, in a content region of a touch screen of a computing device, a detailed view of a first content item from the list of content items;
    detecting a first touch gesture on the detailed view displayed in the content region of the touch screen of the computing device; and
    responsive to the detecting, by one or more processors of the computing device, the first touch gesture, displaying, in the content region of the touch screen simultaneous with the detailed view of the first content item, a list view of a single second content item that immediately precedes the first content item in the list of content items above, below, left, or right of the first content item, the displaying in the content region including only the list view of the single second content item and the detailed view of the first content item; and
    responsive to detecting, by the one or more processors, a second touch gesture that continues from the first touch gesture on the detailed view of the first, content, item, displaying, in the content region of the touch screen, in place of the list view of the single second content item, and while still displaying the detailed view of the first content item, a list view of a single third content item that immediately precedes the second content item in the list of content items, the displaying in the content region including only the list view of the single third content item and the detailed view of the first content item.

2. The method of claim 1, further comprising:
    responsive to detecting a third gesture representing a selection of the single third content item, displaying a detailed view of the third content item in place of the detailed view of the first content item.

3. The method of claim 2, wherein detecting the third gesture consists of detecting the finger pressed to the touch screen display is lifted from the touch screen display.

4. The method of claim 1, wherein detecting a first gesture includes detecting the finger pressed to the touch screen display on which the detailed view of the first content item is displayed, and then detecting movement of the finger in an upward or downward direction relative to the top of the touch screen display.

5. The method of claim 4, wherein displaying a list view of the second content item includes displaying an animation in which the list view of the second content item appears to move on the touch screen display in the upward or downward direction, respectively, in direct response to detection of the movement of the finger.

6. The method of claim 1, wherein detecting the first gesture includes detecting the finger pressed to the touch screen display on which the detailed view of the first content item is displayed, and then detecting movement of the finger in a right-to-left or a left-to-right direction relative to a side of the touch screen display perpendicular to a top of the touch screen display.

7. The method of claim 6, wherein displaying a list view of the single second content item includes displaying an animation in which the list view of the single second content item appears to move on the touch screen display in the right-to-left or the left-to-right direction, respectively in direct response to detection of the movement of the finger.

8. The method of claim 1, wherein detecting the second gesture includes detecting a jog gesture and displaying the single third content item includes dynamically displaying the next preceding content item in the list of content items in place of the single second content item.

9. The method of claim 8, wherein detecting the jog gesture includes detecting a finger pressed in a first location on a touch screen display, detecting the finger being moved left, right, upward, or downward on the screen, and detecting the finger returning to the first location.

10. The method of claim 9, wherein selecting the single third content item consists of detecting the finger is lifted from the touch screen display.

11. A method to enable navigation of a list of content items, each content item in the list having a list view and a detailed view, the method comprising:
    while displaying, in a content region of a touch screen of a computing device, a detailed view of a first content item from the list of content items;
    detecting a first touch gesture on the detailed view displayed in the content region of the touch screen of the computing device; and
    responsive to the detecting, by one or more processors of the computing device, the first touch gesture, displaying, in the content region of the touch screen simultaneous with the detailed view[7] of the first content item, a list view of a single second content item that immediately follows the first content item in the list of content items above, below, left, or right of the first content item, the displaying in the content region including only the list view of the single second content item and the detailed view of the first content item: and responsive to detecting, by the one or more processors, a second touch gesture that continues from the first touch gesture on the detailed view of the first content item, displaying, in the content region of the touch screen, in place of the list view of the single second content item, and while still displaying the detailed view of the first content item, a list view of a single third content item that immediately follows the second content item in the list of content items, the displaying in the content region including only the list view of the single third content item and the detailed view of the first content item.

12. The method of claim 11, wherein detecting the first gesture includes detecting the finger pressed to the touch screen display on which the detailed view of the first content item is displayed, and then detecting movement of the finger in an upward or downward direction relative to the top of the touch screen display.

13. The method of claim 12, wherein displaying a list view of the single second content item includes displaying an animation in which the list view of the second content item appears to move on the touch screen display in the upward or downward direction, respectively, in direct response to detection of the movement of the finger.

14. The method of claim 11, wherein detecting a first gesture includes detecting the finger pressed to the touch screen display on which the detailed view of the first content item is displayed, and then detecting movement of the finger in a right-to-left or a left-to-right direction relative to a side of the touch screen display perpendicular to a top of the touch screen display.

15. The method of claim 14, wherein displaying a list view of the second content item includes displaying an animation in which the list view of the single second content item appears to move on the touch screen display in the right-to-left or the left-to-right direction, respectively in direct response to detection of the movement of the finger.

16. The method of claim 11, wherein detecting the second gesture includes detecting a jog gesture and displaying the third content item includes dynamically updating the display with the next following content item in the list of content items in place of the single second content item.

17. A computing device to facilitate navigating a list of content items, the device comprising:
a touch screen;
a memory:
a hardware processor for executing instructions stored in the memory, the instructions, when executed, cause the computing device to perform operations including:
while displaying, in a content region of the touch screen, a detailed view of a first content item from the list of content items:
detecting a first touch gesture on the detailed view displayed in the content region of the touch screen of the computing device;
responsive to the detecting the first touch gesture, displaying, in the content region of the touch screen simultaneous with the detailed view of the first content item, a list view of a single second content item that immediately precedes or follows the first content item in the list of content items above, below, left, or right of the first content item, the displaying in the content region including only the list view of the second content item and the detailed view of the first content item; and
responsive to detecting a second touch gesture that continues from the first touch gesture on the detailed view of the first content item, displaying, in the content region of the touch screen, in place of the list view of the single second content item, and while still displaying the detailed view of the first content item, a list view of a single third content item that immediately precedes or follows the second content item in the list of content items, the displaying in the content region including only the list view of the single third content item and the detailed view of the first content item.

18. The computing device of claim 17, wherein the operations further include: responsive to detecting a third gesture representing a selection of the single third content item, displaying a detailed view of the third content item in place of the detailed view of the first content item.

19. The computing device of claim 18, wherein the instructions for detecting the third gesture consist of instructions for detecting the finger pressed to the touch screen display is lifted from the touch screen display.

20. The computing device of claim 19, wherein instructions for detecting the second gesture include instructions for detecting a jog gesture and displaying the single third content item includes dynamically updating the display with the next preceding or following content item in the list of content items in place of the single second content item, wherein detecting the jog gesture includes detecting a finger pressed in a first location on the touch screen, detecting the finger being moved left, right, upward, or downward on the screen, and detecting the finger returning to the first location.

* * * * *

UNITED STATES PATENT AND TRADEMARK OFFICE
CERTIFICATE OF CORRECTION

PATENT NO. : 9,939,992 B2  
APPLICATION NO. : 14/639847  
DATED : April 10, 2018  
INVENTOR(S) : Yoo et al.

It is certified that error appears in the above-identified patent and that said Letters Patent is hereby corrected as shown below:

In the Claims

In Column 15, Line 63, in Claim 1, delete "first, content, item," and insert --first content item,-- therefor In Column 16, Line 64, in Claim 11, delete "view⁷"" and insert --view-- therefor In Column 17, Line 3, in Claim 11, delete "item: and" and insert --item; and¶-- therefor In Column 17, Line 49, in Claim 17, delete "memory:" and insert --memory;-- therefor In Column 18, Line 31, in Claim 18, after "include:", insert --¶--

Signed and Sealed this  
Thirteenth Day of August, 2019

Andrei Iancu  
*Director of the United States Patent and Trademark Office*